US012745694B2

(12) United States Patent
Hartogh

(10) Patent No.: US 12,745,694 B2
(45) Date of Patent: Sep. 29, 2026

(54) SEED METER WITH INTEGRAL MOUNTING METHOD FOR ROW CROP PLANTER AND ASSOCIATED SYSTEMS AND METHODS

(71) Applicant: Ag Leader Technology, Ames, IA (US)

(72) Inventor: Alex Hartogh, Huxley, IA (US)

(73) Assignee: Ag Leader Technology, Ames, IA (US)

( * ) Notice: Subject to any disclaimer, the term of this patent is extended or adjusted under 35 U.S.C. 154(b) by 554 days.

(21) Appl. No.: 18/101,394

(22) Filed: Jan. 25, 2023

(65) Prior Publication Data

US 2023/0232732 A1 Jul. 27, 2023

Related U.S. Application Data

(60) Provisional application No. 63/302,824, filed on Jan. 25, 2022.

(51) Int. Cl.
*A01C 7/20* (2006.01)

(52) U.S. Cl.
CPC .................................... *A01C 7/201* (2013.01)

(58) Field of Classification Search
CPC ...................................................... A01C 7/201
See application file for complete search history.

(56) References Cited

U.S. PATENT DOCUMENTS

| | | | |
|---|---|---|---|
| 9,439 | A | 12/1852 | colver |
| 140,493 | A | 7/1873 | Fulghum |
| 540,458 | A | 6/1895 | Robbins |
| 658,348 | A | 9/1900 | Crowley |
| 717,048 | A | 12/1902 | Stirling |
| 1,220,684 | A | 3/1917 | Ray |
| 1,252,923 | A | 1/1918 | Moench |
| 1,264,454 | A | 4/1918 | Terrell |
| 1,376,933 | A | 5/1921 | Gould, Jr. |
| 1,397,689 | A | 11/1921 | Krotz |

(Continued)

FOREIGN PATENT DOCUMENTS

| | | | |
|---|---|---|---|
| AU | 2018100865 | B4 | 6/2022 |
| BR | 102015003633 | B1 | 12/2015 |

(Continued)

OTHER PUBLICATIONS

Salte et al. Nov. 12, 1997 CZ203397A3 (Year: 1997).

(Continued)

*Primary Examiner* — Matthew R Buck
(74) *Attorney, Agent, or Firm* — DENTONS DAVIS BROWN PC; Matthew Warner-Blankenship; Kassandra Rittmer

(57) ABSTRACT

A seed meter assembly comprising a main body assembly comprising, a pivot mounting point, a first meter half shell, a seed hopper, and two snap-in attachments. The meter assembly also including a meter cover assembly comprising a second meter half shell and a seed disc, wherein the meter cover assembly and the main body assembly are configured to be fitted together. The meter assembly also including a support structure configured to be attached to the two snap-in attachments to support the weight of the meter assembly and maintaining access to the meter assembly.

11 Claims, 28 Drawing Sheets

(56) References Cited

U.S. PATENT DOCUMENTS

| | | | |
|---|---|---|---|
| 1,566,187 | A | 12/1925 | Fifer |
| 1,997,791 | A | 4/1935 | Hoberg |
| 2,053,390 | A | 9/1936 | Bateman |
| 2,054,552 | A | 9/1936 | Wakeham |
| 2,141,044 | A | 12/1938 | Rassmann |
| 2,340,163 | A | 1/1944 | White |
| 2,440,846 | A | 5/1948 | Cannon |
| 2,510,658 | A | 6/1950 | Rassmann |
| 2,525,435 | A | 10/1950 | White |
| 2,566,406 | A | 9/1951 | Dougherty |
| 2,589,762 | A | 3/1952 | Barnett |
| 2,673,536 | A | 3/1954 | Skinner |
| 2,913,086 | A | 11/1959 | Wade |
| 2,975,936 | A | 3/1961 | Rousek |
| 2,980,043 | A | 4/1961 | Beck |
| 3,077,290 | A | 2/1963 | Rehder |
| 3,122,283 | A | 2/1964 | Walters |
| 3,176,636 | A | 4/1965 | Wilcox et al. |
| 3,253,739 | A | 5/1966 | Martin |
| 3,272,159 | A | 9/1966 | Sanderson |
| 3,325,060 | A | 6/1967 | Rehder |
| 3,343,507 | A | 9/1967 | Smith |
| 3,413,941 | A | 12/1968 | Roberson |
| 3,509,837 | A | 5/1970 | Erickson |
| 3,693,833 | A | 9/1972 | Weitz |
| 3,796,346 | A | 3/1974 | Ribouleau |
| 3,797,418 | A | 3/1974 | Bridger |
| 3,913,503 | A | 10/1975 | Becker |
| 3,990,606 | A | 11/1976 | Gugenhan |
| 4,002,266 | A | 1/1977 | Beebe |
| 4,023,509 | A | 5/1977 | Hanson |
| 4,026,437 | A | 5/1977 | Biddle |
| 4,029,235 | A | 6/1977 | Grataloup |
| 4,037,755 | A | 7/1977 | reuter |
| 4,116,139 | A | 9/1978 | Sauer |
| 4,122,974 | A | 10/1978 | Harbert |
| 4,193,523 | A | 3/1980 | Koning |
| 4,209,109 | A | 6/1980 | Curl |
| 4,282,985 | A | 8/1981 | Yamamoto |
| 4,288,008 | A | 9/1981 | Amblard |
| 4,324,347 | A | 4/1982 | Thomas |
| 4,333,561 | A | 6/1982 | Schlegel |
| 4,449,642 | A | 5/1984 | Dooley |
| 4,600,122 | A | 7/1986 | Lundie et al. |
| 4,613,056 | A | 9/1986 | Olson |
| 4,653,410 | A | 3/1987 | Typpi |
| 4,793,511 | A | 12/1988 | Ankum |
| 4,899,672 | A | 2/1990 | Paul |
| 4,949,656 | A | 8/1990 | Lyle |
| 4,949,869 | A | 8/1990 | Ribouleau |
| 5,058,766 | A | 10/1991 | Deckler |
| 5,161,472 | A | 11/1992 | Handy |
| 5,170,909 | A | 12/1992 | Lundie et al. |
| 5,333,559 | A | 8/1994 | Hodapp |
| 5,425,318 | A | 6/1995 | Keeton |
| 5,501,366 | A | 3/1996 | Fiorido |
| 5,601,209 | A | 2/1997 | Barsi |
| 5,664,507 | A | 9/1997 | Bergland et al. |
| 5,697,308 | A | 12/1997 | Rowlett |
| 5,720,233 | A | 2/1998 | Lodico |
| 5,740,747 | A | 4/1998 | Stufflebeam |
| 5,765,720 | A | 6/1998 | Stufflebeam |
| 5,799,598 | A | 9/1998 | Stufflebeam |
| 5,848,571 | A | 12/1998 | Stufflebeam |
| 5,915,313 | A | 6/1999 | Bender |
| 5,936,234 | A | 8/1999 | Thomas et al. |
| 5,975,283 | A | 11/1999 | Riffe |
| 6,116,172 | A | 9/2000 | Prairie |
| 6,119,608 | A | 9/2000 | Peterson |
| 6,142,086 | A | 11/2000 | Richard |
| 6,260,632 | B1 | 7/2001 | Bourgault et al. |
| 6,269,758 | B1 | 8/2001 | Sauder |
| 6,293,438 | B1 | 9/2001 | Woodruff |
| 6,352,042 | B1 | 3/2002 | Martin |
| 6,516,733 | B1 | 2/2003 | Sauder |
| 6,640,731 | B1 | 11/2003 | Rowlett |
| 6,651,570 | B1 | 11/2003 | Thiemke |
| 6,681,706 | B2 | 1/2004 | Sauder |
| 6,718,892 | B1 | 4/2004 | Rosenboom |
| 6,748,885 | B2 | 6/2004 | Sauder |
| 6,752,095 | B1 | 6/2004 | Rylander et al. |
| 7,131,384 | B2 | 11/2006 | Kester |
| 7,263,937 | B2 | 9/2007 | Frasier |
| 7,334,532 | B2 | 2/2008 | Sauder et al. |
| 7,404,366 | B2 | 7/2008 | Mariman |
| 7,448,334 | B2 | 11/2008 | Mariman |
| 7,490,565 | B2 | 2/2009 | Holly |
| 7,581,684 | B2 | 9/2009 | des Garennes et al. |
| 7,584,707 | B2 | 9/2009 | Sauder et al. |
| 7,661,377 | B2 | 2/2010 | Keaton |
| 7,854,206 | B2 | 12/2010 | Horsch |
| 7,918,168 | B2 | 4/2011 | Garner |
| 8,074,586 | B2 | 12/2011 | Garner |
| 8,201,507 | B2 | 6/2012 | Sauder |
| 8,276,529 | B2 | 10/2012 | Garner |
| 8,322,293 | B2 | 12/2012 | Wollenhaupt et al. |
| 8,336,471 | B2 | 12/2012 | Gilstring |
| 8,375,873 | B2 | 2/2013 | Nelson et al. |
| 8,375,874 | B2 | 2/2013 | Peterson |
| 8,443,742 | B2 | 5/2013 | Orrenius |
| 8,448,585 | B2 | 5/2013 | Wilhelmi et al. |
| 8,468,960 | B2 | 6/2013 | Garner |
| 8,522,699 | B2 | 9/2013 | Garner |
| 8,544,395 | B2 | 10/2013 | Dietrich |
| 8,671,856 | B2 | 3/2014 | Garner et al. |
| 8,677,914 | B2 | 3/2014 | Stark |
| 8,746,159 | B2 | 6/2014 | Garner et al. |
| 8,789,482 | B2 | 7/2014 | Garner |
| 8,789,483 | B2 | 7/2014 | Gilstring |
| 8,800,457 | B2 | 8/2014 | Garner |
| 8,813,663 | B2 | 8/2014 | Garner |
| 8,850,995 | B2 | 10/2014 | Garner |
| 8,850,998 | B2 | 10/2014 | Garner et al. |
| 8,903,545 | B2 | 12/2014 | Riffel |
| 8,942,896 | B2 | 1/2015 | Mayerle |
| 8,978,564 | B2 | 3/2015 | Hagny |
| 8,985,037 | B2 | 3/2015 | Radtke |
| 9,119,342 | B2 | 9/2015 | Bonefas |
| 9,137,941 | B2 | 9/2015 | Stark |
| 9,148,992 | B2 | 10/2015 | Staeter |
| 9,151,388 | B2 | 10/2015 | Gilstring |
| 9,265,191 | B2 | 2/2016 | Sauder |
| 9,277,688 | B2 | 3/2016 | Wilhelmi |
| 9,282,691 | B2 | 3/2016 | Wilhelmi |
| 9,282,692 | B2 | 3/2016 | Wilhelmi |
| 9,313,941 | B2 | 4/2016 | Garner |
| 9,313,942 | B2 | 4/2016 | Wilhelmi |
| 9,332,689 | B2 | 5/2016 | Baurer et al. |
| 9,345,188 | B2 | 5/2016 | Garner |
| 9,351,440 | B2 | 5/2016 | Sauder |
| 9,426,940 | B2 | 8/2016 | Connors et al. |
| 9,433,141 | B2 | 9/2016 | Friestad |
| 9,480,199 | B2 | 11/2016 | Garner |
| 9,491,901 | B2 | 11/2016 | Gentili |
| 9,510,502 | B2 | 12/2016 | Garner et al. |
| 9,544,395 | B2 | 1/2017 | Godfrey et al. |
| 9,578,802 | B2 | 2/2017 | Radtke |
| 9,603,298 | B2 | 3/2017 | Wendte et al. |
| 9,622,402 | B2 | 4/2017 | Kinzenbaw et al. |
| 9,629,301 | B2 | 4/2017 | Gentili |
| 9,629,302 | B2 | 4/2017 | Gentili |
| 9,661,799 | B2 | 5/2017 | Garner |
| 9,668,402 | B2 | 6/2017 | Hagny |
| 9,675,002 | B2 | 6/2017 | Roszman |
| 9,686,906 | B2 | 6/2017 | Garner et al. |
| 9,693,498 | B2 | 7/2017 | Zumdome |
| 9,699,955 | B2 | 7/2017 | Garner |
| 9,706,702 | B2 | 7/2017 | Wendte et al. |
| 9,730,379 | B2 | 8/2017 | Wendte |
| 9,733,634 | B2 | 8/2017 | Prickel |
| 9,756,779 | B2 | 9/2017 | Wilhelmi et al. |
| 9,769,978 | B2 | 9/2017 | Radtke |
| 9,807,921 | B2 | 11/2017 | Levy et al. |
| 9,807,922 | B2 | 11/2017 | Garner |

(56) References Cited

U.S. PATENT DOCUMENTS

| | | | |
|---|---|---|---|
| 9,807,924 B2 | 11/2017 | Garner et al. | |
| 9,814,176 B2 | 11/2017 | Kowalchuk | |
| 9,820,427 B2 | 11/2017 | Hagny | |
| 9,820,429 B2 | 11/2017 | Garner | |
| 9,832,924 B2 * | 12/2017 | Anderson | A01C 15/006 |
| 9,861,025 B2 | 1/2018 | Schaefer et al. | |
| 9,861,031 B2 | 1/2018 | Garner | |
| 9,872,424 B2 | 1/2018 | Baurer et al. | |
| 9,936,627 B2 | 4/2018 | Wilhelmi et al. | |
| 9,936,628 B2 | 4/2018 | Wilhelmi et al. | |
| 9,949,426 B2 | 4/2018 | Radtke | |
| 9,980,426 B2 | 5/2018 | Wilhelmi et al. | |
| 10,004,173 B2 | 6/2018 | Garner | |
| 10,010,024 B2 | 7/2018 | Pirkenseer et al. | |
| 10,045,477 B2 | 8/2018 | Hagny | |
| 10,051,782 B2 | 8/2018 | Wilhelmi et al. | |
| 10,104,832 B2 | 10/2018 | Wilhelmi et al. | |
| 10,154,623 B2 | 12/2018 | Wilhelmi et al. | |
| 10,206,326 B2 | 2/2019 | Garner | |
| 10,257,973 B2 | 4/2019 | Hubner et al. | |
| 10,299,425 B2 | 5/2019 | Sauder et al. | |
| 10,398,077 B2 | 9/2019 | Radtke | |
| 10,470,358 B2 | 11/2019 | Sauder et al. | |
| 10,485,159 B2 | 11/2019 | Wilhelmi et al. | |
| 10,609,857 B2 | 4/2020 | Sauder et al. | |
| 10,729,063 B2 | 8/2020 | Garner | |
| 10,743,460 B2 | 8/2020 | Gilbert | |
| 10,806,070 B2 | 10/2020 | Garner et al. | |
| RE48,572 E | 6/2021 | Garner | |
| 11,051,445 B2 | 7/2021 | Hubner | |
| 11,058,048 B2 | 7/2021 | Radtke | |
| 11,144,775 B2 | 10/2021 | Ferrari et al. | |
| 11,202,404 B2 | 12/2021 | Walter et al. | |
| 11,277,961 B2 | 3/2022 | Campbell | |
| 11,523,554 B2 | 12/2022 | Buehler | |
| 11,672,195 B2 | 6/2023 | Stoller | |
| 11,730,079 B2 | 8/2023 | Wilhelmi | |
| 11,785,881 B2 | 10/2023 | Buehler | |
| 11,818,977 B2 | 11/2023 | Anderson | |
| 11,877,530 B2 | 1/2024 | Barry | |
| 11,997,939 B2 | 6/2024 | Gilbert | |
| 12,075,719 B2 | 9/2024 | Strnad | |
| 2005/0103244 A1 | 5/2005 | Mayerle | |
| 2010/0224110 A1 | 9/2010 | Mariman | |
| 2011/0028214 A1 | 2/2011 | Bright et al. | |
| 2011/0162566 A1 | 7/2011 | Willhelmi et al. | |
| 2011/0271887 A1 | 11/2011 | Shoup | |
| 2014/0033972 A1 | 2/2014 | Meyer | |
| 2014/0230705 A1 | 8/2014 | Radtke | |
| 2014/0277959 A1 | 9/2014 | Wagers | |
| 2015/0201549 A1 | 7/2015 | Baurer | |
| 2015/0223391 A1 | 8/2015 | Wendte | |
| 2015/0223392 A1 | 8/2015 | Wilhelmi et al. | |
| 2015/0289441 A1 | 10/2015 | Arnett | |
| 2015/0289442 A1 | 10/2015 | Heilman | |
| 2015/0305229 A1 | 10/2015 | Sauder | |
| 2015/0319919 A1 * | 11/2015 | Sauder | A01C 15/006 111/171 |
| 2015/0351315 A1 | 12/2015 | Wendte | |
| 2016/0128269 A1 | 5/2016 | Helmick | |
| 2016/0212932 A1 | 7/2016 | Radtke | |
| 2016/0227700 A1 | 8/2016 | Wendte et al. | |
| 2016/0249525 A1 | 9/2016 | Baurer et al. | |
| 2017/0020058 A1 | 1/2017 | Pirkenseer et al. | |
| 2017/0034995 A1 | 2/2017 | Wilhelmi | |
| 2017/0094894 A1 | 4/2017 | Heim | |
| 2017/0127604 A1 | 5/2017 | Wilhelmi | |
| 2017/0223947 A1 | 8/2017 | Gall et al. | |
| 2017/0332546 A1 | 11/2017 | Garner et al. | |
| 2017/0359949 A1 | 12/2017 | Garner et al. | |
| 2017/0367255 A1 | 12/2017 | Wilhelmi et al. | |
| 2018/0007824 A1 | 1/2018 | Radtke | |
| 2018/0249624 A1 | 9/2018 | Gentili | |
| 2019/0098828 A1 | 4/2019 | Wilhelmi | |
| 2019/0387662 A1 | 12/2019 | Viriat | |
| 2020/0053954 A1 | 2/2020 | Hamilton | |
| 2020/0352088 A1 | 11/2020 | Arnett et al. | |
| 2021/0037699 A1 | 2/2021 | Wilhelmi | |
| 2021/0185903 A1 | 6/2021 | Demiter | |
| 2021/0212252 A1 * | 7/2021 | Wilhelmi | A01C 7/201 |
| 2021/0307236 A1 | 10/2021 | Strnad et al. | |
| 2022/0000008 A1 | 1/2022 | Hubner et al. | |
| 2022/0061208 A1 | 3/2022 | Campbell | |
| 2022/0142041 A1 * | 5/2022 | Johnson | A01C 15/006 |
| 2022/0192080 A1 | 6/2022 | Goza | |
| 2022/0232753 A1 | 7/2022 | Van De Woestyne et al. | |
| 2023/0105245 A1 | 4/2023 | Buehler | |
| 2023/0180653 A1 | 6/2023 | Barry | |
| 2023/0232732 A1 | 7/2023 | Hartogh | |
| 2023/0413720 A1 | 12/2023 | Barry | |
| 2024/0032455 A1 | 2/2024 | Buehler | |
| 2024/0040955 A1 | 2/2024 | Barry | |
| 2024/0315163 A1 | 9/2024 | Gilbert | |

FOREIGN PATENT DOCUMENTS

| | | | |
|---|---|---|---|
| BR | 102016002919 | B1 | 8/2016 |
| CA | 1218266 | A | 2/1987 |
| CA | 2408684 | A1 | 12/2001 |
| CA | 2213350 | C | 7/2002 |
| CA | 2213354 | C | 7/2002 |
| CA | 2213703 | C | 7/2002 |
| CA | 2830627 | C | 9/2012 |
| CA | 2915844 | C | 12/2015 |
| CA | 2923713 | A1 | 12/2016 |
| CN | 201057704 | Y | 5/2008 |
| CN | 206380282 | U | 8/2017 |
| CN | 109463081 | A | 3/2019 |
| CN | 112601450 | A | 4/2021 |
| DE | 389840 | C | 2/1924 |
| DE | 2011462 | A1 | 9/1971 |
| DE | 2826658 | A1 | 4/1981 |
| DE | 8400142 | U1 | 5/1984 |
| DE | 3405031 | C1 | 4/1985 |
| DE | 3826397 | A1 | 1/1989 |
| DE | 102017118594 | | 2/2019 |
| EP | 47577 | A3 | 3/1982 |
| EP | 152048 | A2 | 8/1985 |
| EP | 182220 | B1 | 5/1986 |
| EP | 606541 | A1 | 7/1994 |
| EP | 1461989 | A1 | 9/2004 |
| EP | 2832203 | B1 | 2/2015 |
| EP | 2911497 | B1 | 10/2016 |
| EP | 2911499 | B1 | 10/2016 |
| EP | 3108731 | A8 | 12/2016 |
| EP | 2688384 | B1 | 6/2017 |
| EP | 3219186 | A1 | 9/2017 |
| EP | 2901838 | B1 | 11/2017 |
| EP | 3753388 | A2 | 12/2020 |
| FR | 1229027 | A | 9/1960 |
| FR | 1503687 | A | 12/1967 |
| FR | 2414288 | A1 | 8/1979 |
| FR | 2490064 | A1 | 3/1982 |
| FR | 2591061 | A1 | 6/1986 |
| FR | 2574243 | A1 | 6/1987 |
| FR | 2678472 | A1 | 1/1993 |
| GB | 18381 | A | 10/1904 |
| GB | 482789 | A | 4/1938 |
| GB | 989145 | A | 4/1965 |
| GB | 1136771 | A | 12/1968 |
| GB | 2057835 | A | 4/1981 |
| GB | 2012534 | A | 1/1982 |
| JP | S56-24815 | U | 3/1981 |
| JP | H11-59886 | A | 3/1999 |
| JP | 2007117941 | A | 5/2007 |
| JP | 4517467 | B2 | 8/2010 |
| KR | 20040029905 | A | 4/2004 |
| KR | 20080044756 | A | 5/2008 |
| NL | 1005451 | C2 | 9/1998 |
| RU | 2355152 | C2 | 5/2009 |
| SU | 948316 | A1 | 8/1982 |
| SU | 1148582 | A | 4/1985 |
| WO | 9716954 | A1 | 5/1997 |
| WO | 1998/049884 | A1 | 11/1998 |

(56) References Cited

FOREIGN PATENT DOCUMENTS

| | | | |
|---|---|---|---|
| WO | 2005/011358 | A1 | 2/2005 |
| WO | 2010/059101 | A1 | 5/2010 |
| WO | 2010/124360 | A1 | 11/2010 |
| WO | 2013/130003 | A1 | 9/2013 |
| WO | 2020049467 | A1 | 3/2020 |
| WO | 2021021594 | A1 | 2/2021 |

OTHER PUBLICATIONS

Tempo, Vaderstad, 2017.
Fundamentals of Machine Operation—Planting, Deere & Co. (Breece et al 1975).
John Deere 7000 and 7100 MaxEmerge Planting Unit, parts catalog.
Manual for Deere 495 and 695 planters.
Monosem NG Plus seed meter; 1994 Monosem manual.
Fundamentals of Machine Operation—Planting, Deere & Co. (Breece et al 1981).
John Deere Planter Models 71 Flexi, 495A, 695A.
John Deere Operators Manual 694A, 695A, and 894A Corn Planters (OMB25391 E7).
John Deere 494-A and 495-A Four-row Corn Planters (A1477-62-12-Pltr. (Litho in USA)).
Kinze Promotion Video True Speed—3D with Ultra Slow Motion.
Kinze Promotional Brochure "High Speed Planting Solution True Speed".
Ag leader Promotional Video "Ag Leader SureSpeed".
Ag Leader Promotional Video "Ag Leader SureSpeed Unveiling".
Kinze Promotional video "an in-depth look into kinze's true speed".
Oberschmid Jan. 5, 1989 Seed-desposting Synchronising Device for High-speed Agricultural Seed Drills (Year: 1989).

* cited by examiner

SEED METER WITH INTEGRAL MOUNTING METHOD FOR ROW CROP PLANTER AND ASSOCIATED SYSTEMS AND METHODS

CROSS-REFERENCE TO RELATED APPLICATION(S)

This application claims the benefit under 35 U.S.C. § 119(e) to U.S. Provisional Application 63/302,824, filed Jan. 25, 2022, and entitled SEED METER WITH INTEGRAL MOUNTING METHOD FOR ROW CROP PLANTER, which is hereby incorporated herein by reference in its entirety for all purposes.

TECHNICAL FIELD

The disclosure relates generally to agricultural planters and row units.

BACKGROUND

Known row crop planters and row units for row crop planters share many similarities in design among various models and manufacturers. Typically, the seed meter is located by and attached to a seed hopper. The seed hoper, in turn, is attached to the row unit via pivot points in the front and a tie point in the rear so that the weight of the seed hopper is carried on the row unit and not by the meter assembly. As would be understood, both fractional and multi-bushel hoppers are typically mounted in this manner.

As shown for example in FIGS. 1-3, known methods and devices for mounting and supporting seed meters 10 and hoppers 20 typically obstruct the view and access to the seed meter 10, such that to service the seed meter 10 either or both the seed meter 10 and seed hopper 20 must be fully removed from the row unit 2. As such, servicing such a seed meter 10 causes additional downtime negatively affecting efficiency and productivity.

There is a need in the art for improved mounting and supporting devices and methods for seed meters and hoppers.

BRIEF SUMMARY

Disclosed herein are various devices, systems, and methods for mounting and supporting a seed meter and hopper assembly.

In Example 1, a seed meter assembly comprising a main body assembly, the main body assembly comprising a pivot mounting point and two snap-in attachments. The seed meter assembly also comprising a meter cover assembly, wherein the meter cover assembly and the main body assembly are configured to be releasably engaged and a support structure configured to be attached to the two snap-in attachments to support the weight of the seed meter assembly and maintain access to the seed meter assembly.

Example 2 relates to the seed meter assembly of Example 1, wherein the support structure comprises a first arm, a second arm, a first snap-in feature at the distal end of the first arm, and a second snap-in feature at the distal end of the second arm, wherein the first snap-in feature is configured to engage a first of the two snap-in attachments and wherein the second snap-in feature is configured to engage a second of the two snap-in attachments.

Example 3 relates to the seed meter assembly of Example 1 or 2, wherein the support structure further comprises a center portion connecting the first arm and the second arm, the center portion comprising a latch groove.

Example 4 relates to the seed meter assembly of any of Examples 1-3, further comprising a latch disposed on a row unit, wherein a hook of the latch engages the latch groove.

Example 5 relates to the seed meter assembly of any of Examples 1-4, wherein the latch is an under-center latch.

Example 6 relates to the seed meter assembly of any of Examples 1-5, further comprising a peg disposed on a row unit side of the center portion of the support structure, wherein the peg is configured to prevent lateral movement of the support structure when installed.

Example 7 relates to the seed meter assembly of any of Examples 1-6, wherein the peg is tapered.

Example 8 relates to the seed meter assembly of any of Examples 1-7, wherein the peg is configured to fit within a receiving feature on the row unit.

Example 9 relates to the seed meter assembly of any of Examples 1-8, further comprising a bracket comprising the receiving feature and the under-center latch.

Example 10 relates to the seed meter assembly of any of Examples 1-9, further comprising a third snap-in feature at the distal end of the first arm and a fourth snap-in feature at the distal end of the first arm, wherein the third snap-in feature is configured to engage the first of the two snap-in attachments and wherein the fourth snap-in feature is configured to engage the second of the two snap-in attachments.

Example 11 relates to the seed meter assembly of any of Examples 1-10, wherein at least of portion of the first arm is received within the first of the two snap-in attachments and at least of portion of the second arm is received within the second of the two snap-in attachments.

Example 12 relates to the seed meter assembly of any of Examples 1-11, wherein the support structure is substantially U-shaped.

In Example 13, a seed meter support, comprising a first arm, a second arm, a center portion connecting the first arm and the second arm forming a substantially U-shaped support, a first snap-in feature at the distal end of the first arm, and a second snap-in feature at the distal end of the second arm, wherein the first snap-in feature is configured to engage a first snap-in attachment on a seed meter and wherein the second snap-in feature is configured to engage a second snap-in attachment on the seed meter.

Example 14 relates to the seed meter support of Example 13, further comprising a third snap-in feature at the distal end of the first arm and a fourth snap-in feature at the distal end of the first arm, wherein the third snap-in feature is configured to engage the first snap-in attachment and wherein the fourth snap-in feature is configured to engage the second snap-in attachment.

Example 15 relates to the seed meter support of Example 13 or 14, wherein at least of portion of the first arm is received within the first snap-in attachment and at least of portion of the second arm is received within the second snap-in attachment.

Example 16 relates to the seed meter support of any of Examples 13-15, further comprising a latch groove formed within the center portion.

Example 17 relates to the seed meter support of any of Examples 13-16, further comprising at least one alignment peg disposed on the center portion.

Example 18 relates to the seed meter support of any of Examples 13-17, wherein the seed meter support is configured to support a fractional bushel hopper.

Example 19 relates to the seed meter support of any of Examples 13-18, wherein the seed meter support is configured for releasable attachment to a row unit and the seed meter.

In Example 20, an agricultural support, comprising: a first arm; a second arm; a center portion connecting the first arm and the second arm forming a substantially U-shaped support; a first snap-in feature and a second snap-in feature at the distal end of the first arm; a third snap-in feature and a fourth snap-in feature at the distal end of the second arm, wherein the first snap-in feature and the second snap-in feature are configured to engage a first snap-in attachment on a seed meter and wherein the third snap-in feature and fourth snap-feature are configured to engage a second snap-in attachment on the seed meter; a latch groove formed within the center portion and shaped to be engaged with a latch for releasable attachment of the agricultural support to a row unit; and a peg disposed on the center portion configured to align the agricultural support with a row unit for installation, wherein the agricultural support is configured to support the seed meter and a fractional hopper.

While multiple embodiments are disclosed, still other embodiments of the disclosure will become apparent to those skilled in the art from the following detailed description, which shows and describes illustrative embodiments of the invention. As will be realized, the disclosure is capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1:
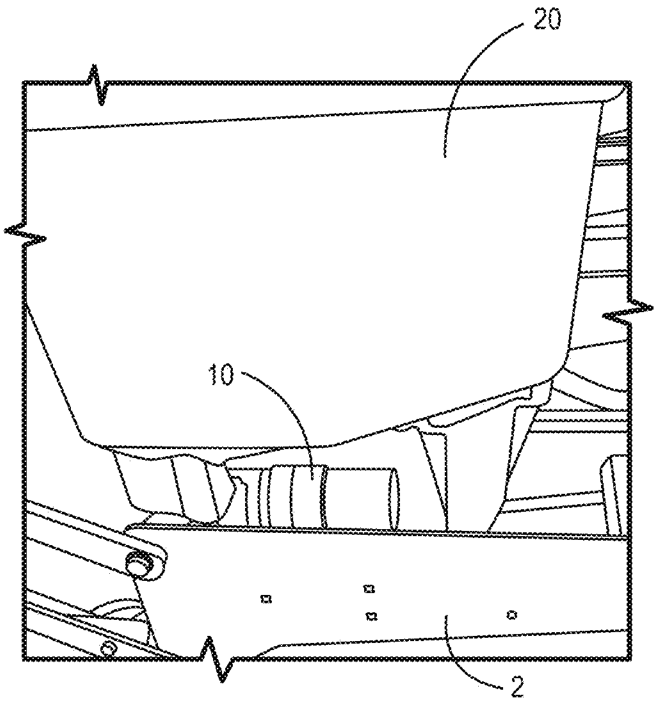
FIG. 1 (Prior Art)
FIG. 1 is a side view of a meter assembly and multi-bushel hopper conventionally installed on a row unit, according to one implementation.
Figure 2:
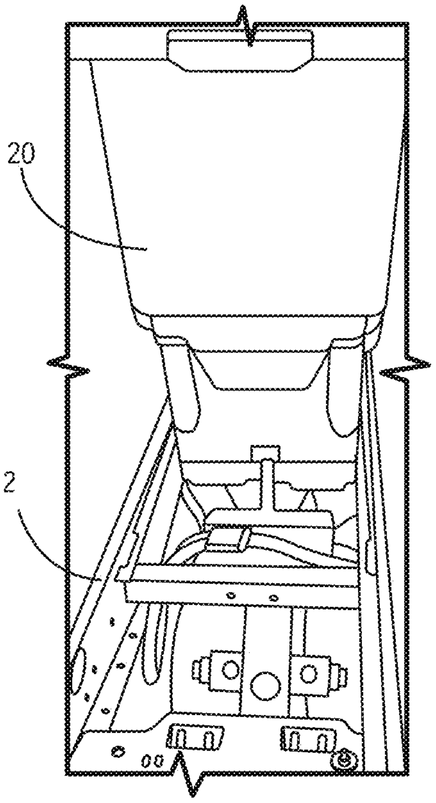
FIG. 2 (Prior Art)
FIG. 2 is a rear view of a meter assembly and multi-bushel hopper conventionally installed on a row unit, according to one implementation.
Figure 3:
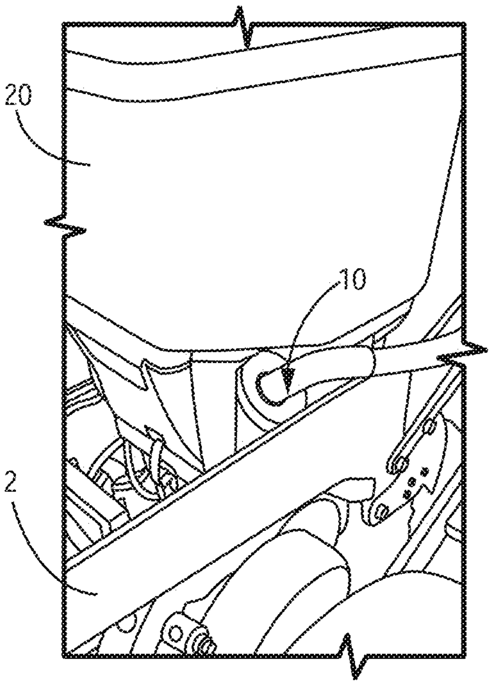
FIG. 3 (Prior Art)
FIG. 3 is a side view of a meter assembly and multi-bushel hopper conventionally installed on a row unit, according to one implementation.
Figure 4:
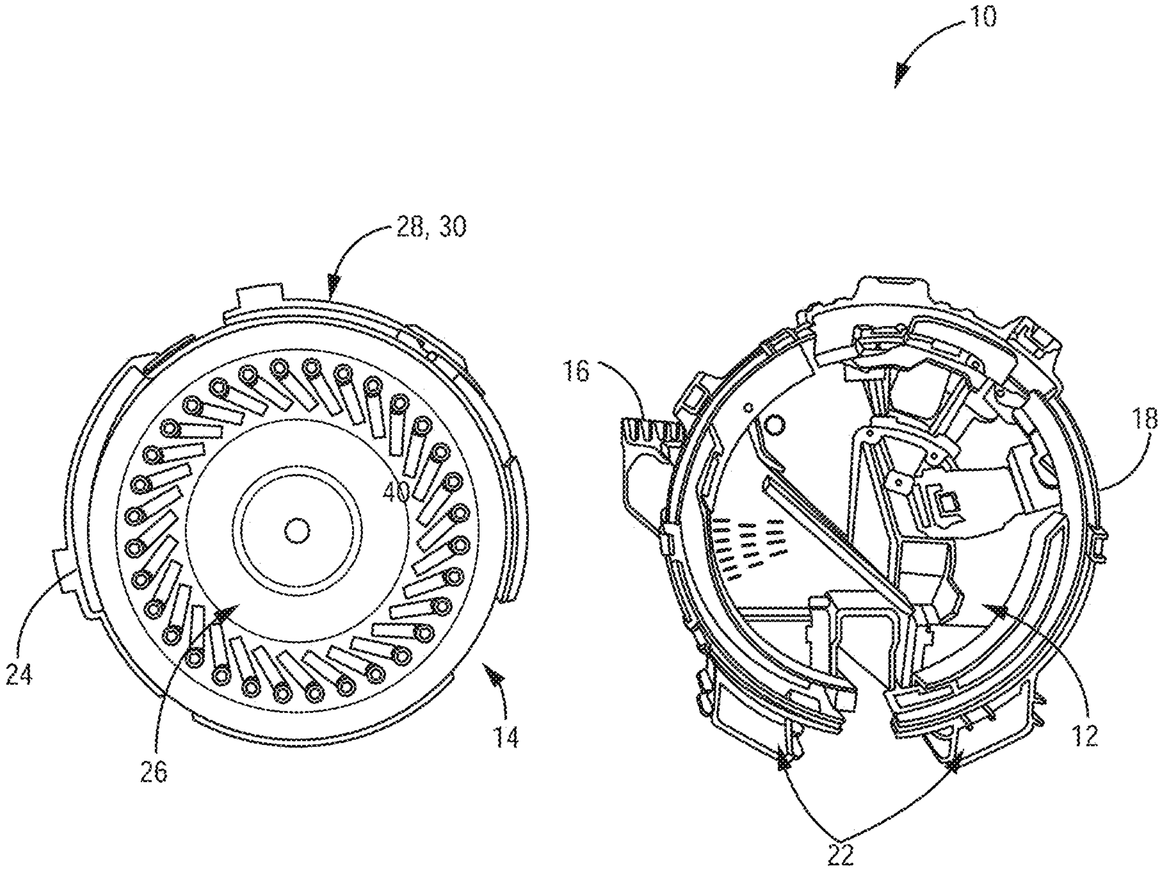
FIG. 4 is a side-by-side view of a disassembled seed meter assembly, according to one implementation.
Figure 5:
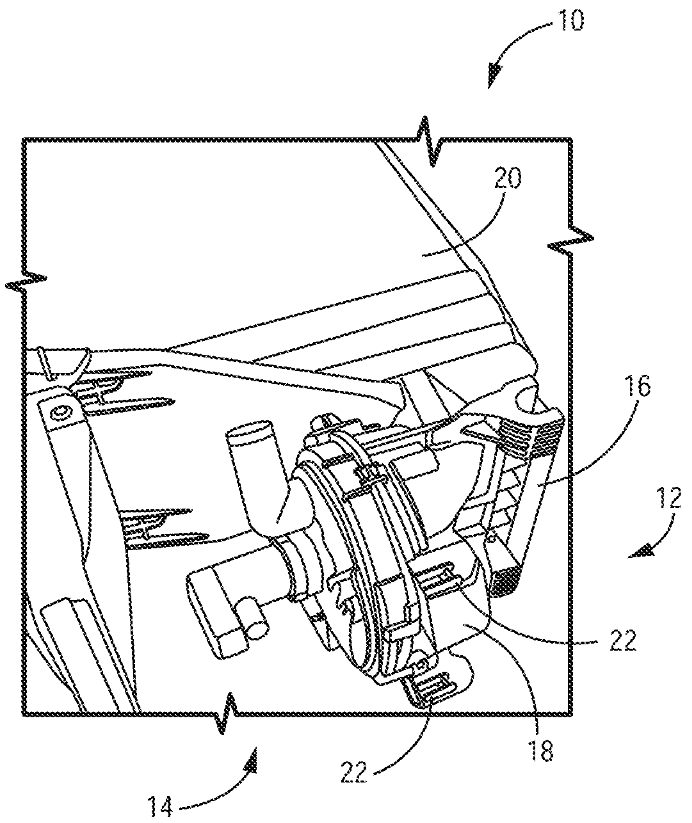
FIG. 5 is a bottom perspective view of a seed meter assembly and hopper, according to one implementation.
Figure 6:
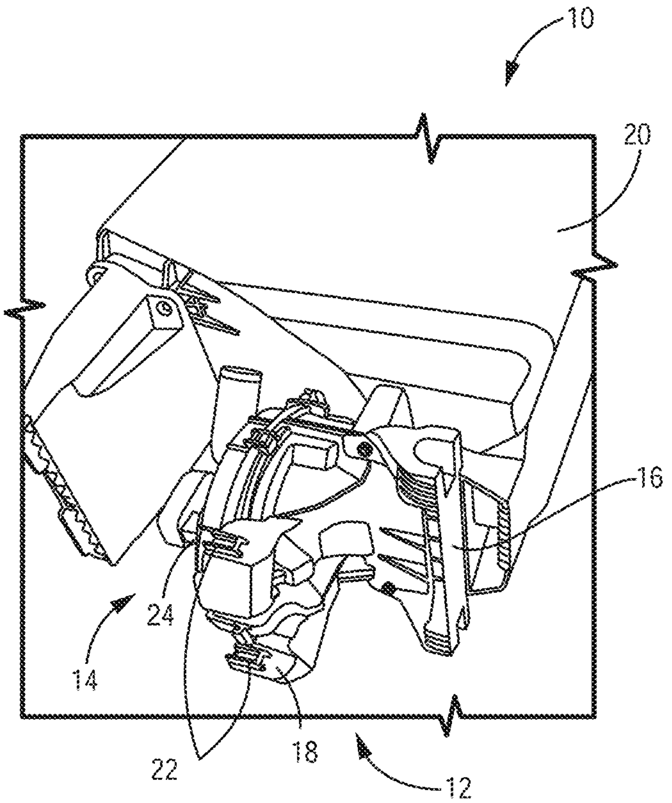
FIG. 6 is a bottom perspective view of a seed meter assembly and hopper, according to one implementation.
Figure 7:
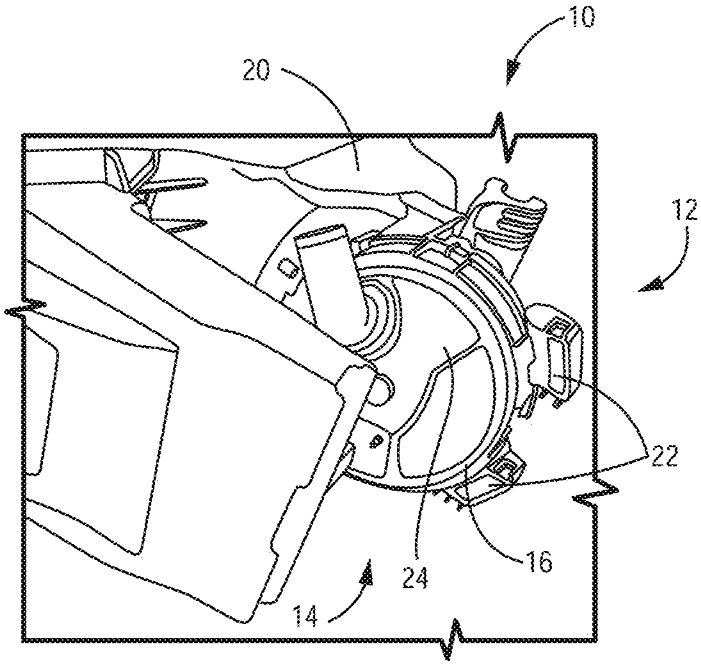
FIG. 7 is a rear perspective view of a seed meter assembly and hopper, according to one implementation.
Figure 8:
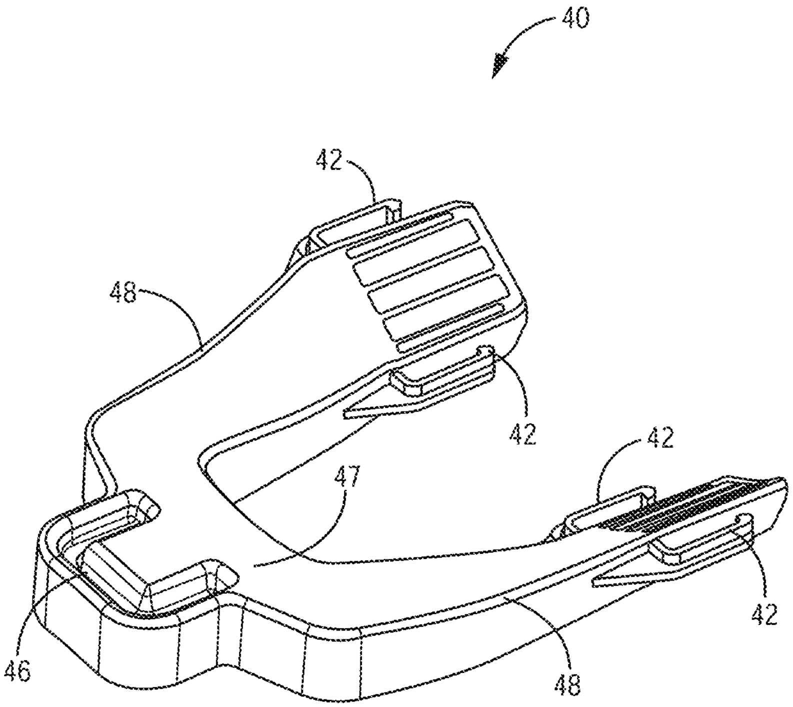
FIG. 8 is a perspective view of the support structure, according to one implementation.
Figure 9:
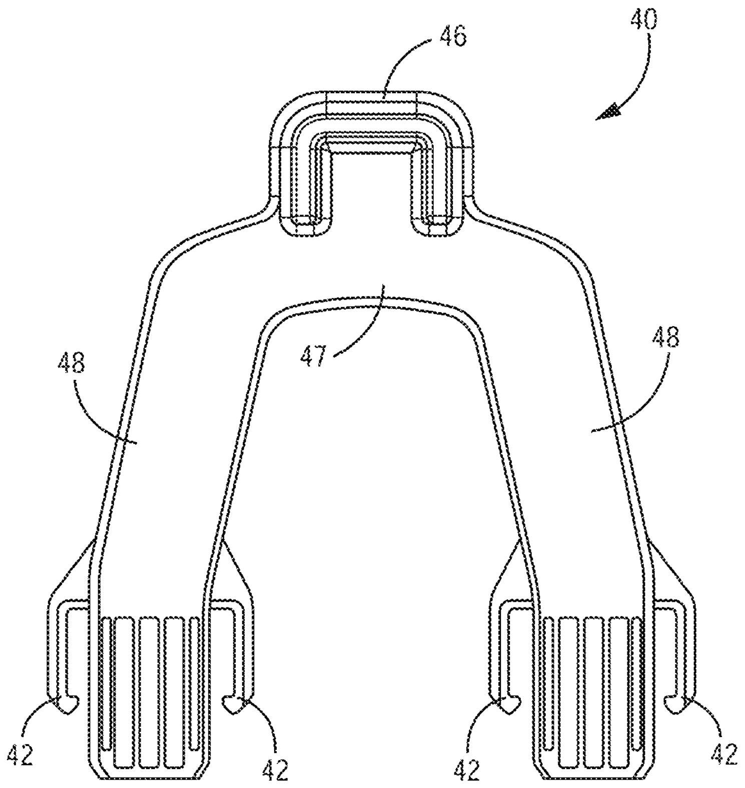
FIG. 9 is a top view of the support structure, according to one implementation.
Figure 10:
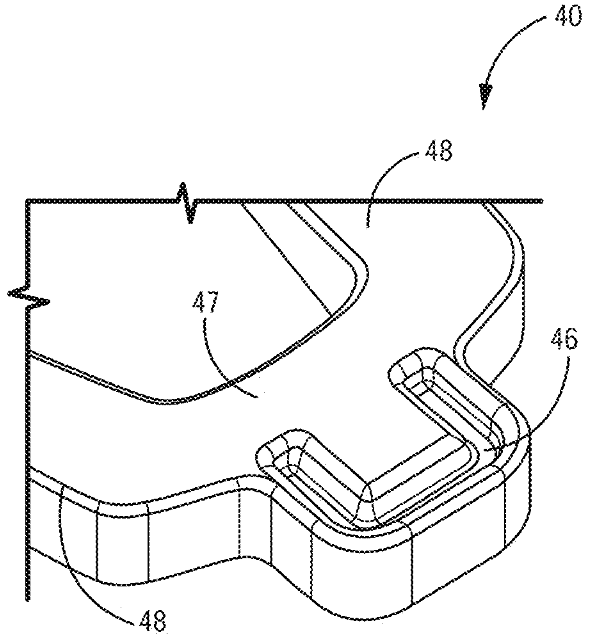
FIG. 10 is a close-up view of a latch groove on the support structure, according to one implementation.
Figure 11:
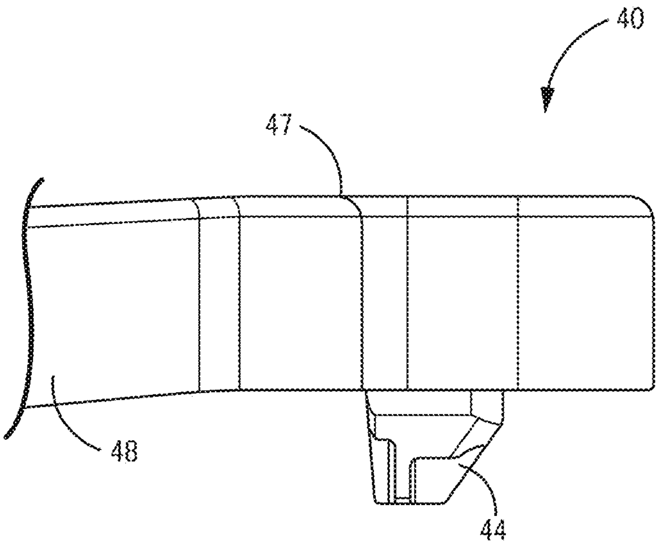
FIG. 11 is a side view of a peg on the support structure, according to one implementation.
Figure 12:
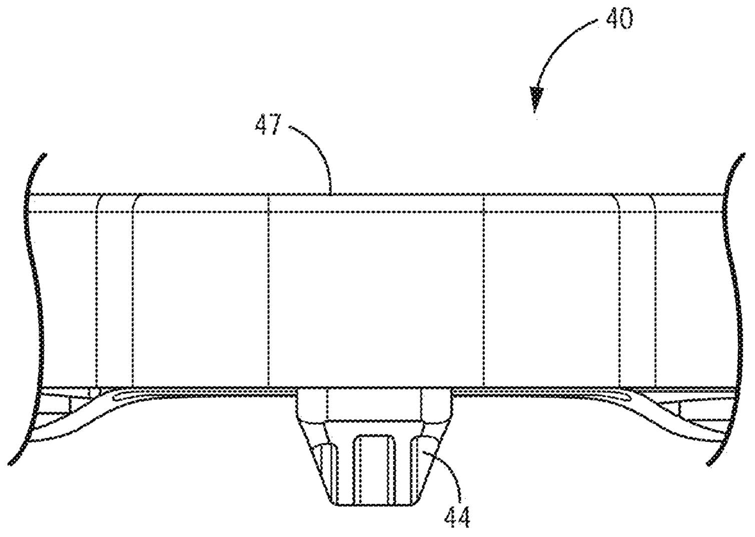
FIG. 12 is a rear view of a peg on the support structure, according to one implementation.
Figure 13:
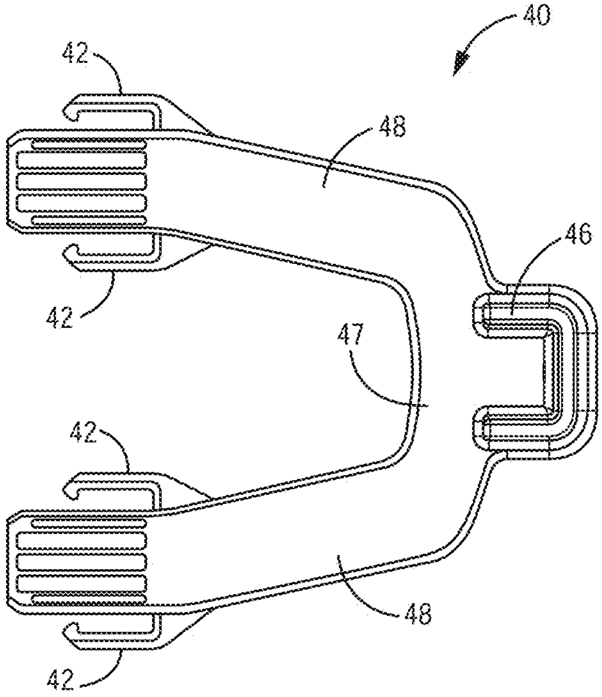
FIG. 13 is a top view of the support structure, according to one implementation.
Figure 14:
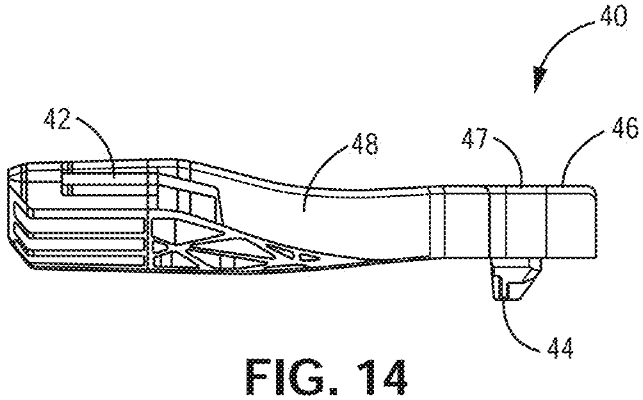
FIG. 14 is a side view of the support structure, according to one implementation.
Figure 15:
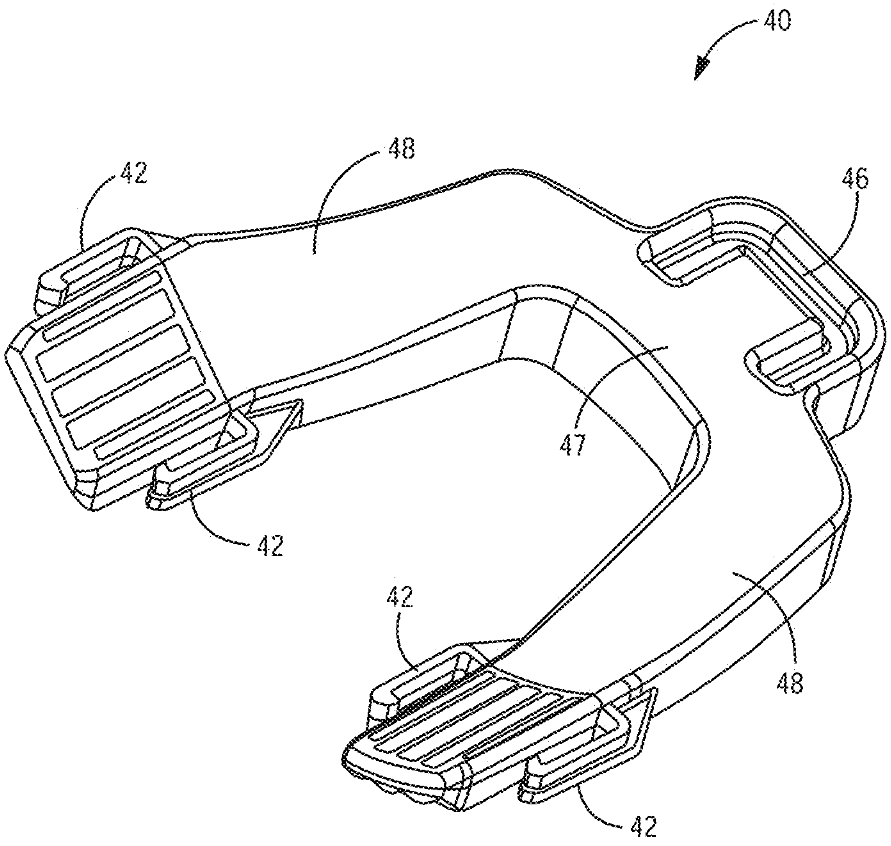
FIG. 15 is a perspective view of the support structure, according to one implementation.
Figure 16:
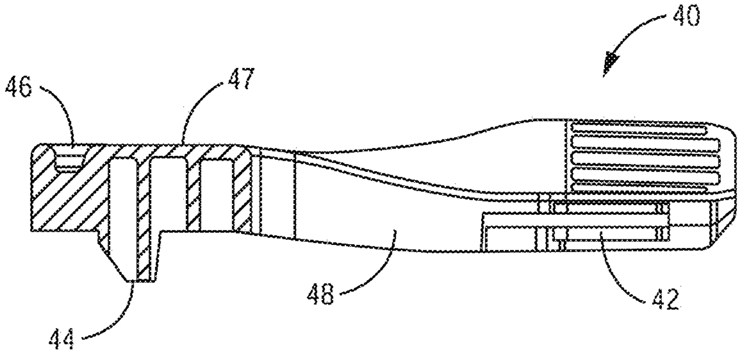
FIG. 16 is a cross sectional view of the support structure, according to one implementation.
Figure 17:
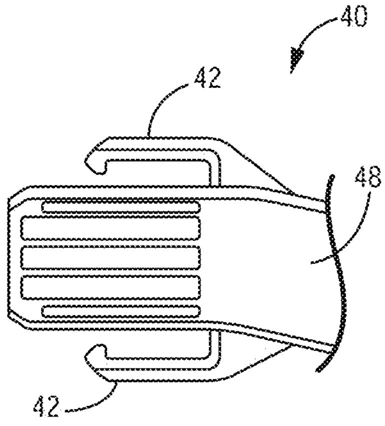
FIG. 17 is a close-up view of the distal end of an arm of the support structure, according to one implementation.
Figure 18:
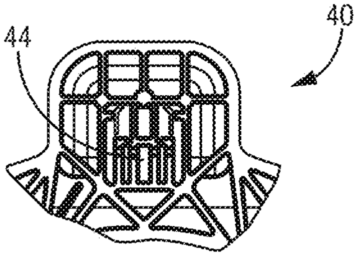
FIG. 18 is a row unit side view of a peg on the support structure, according to one implementation.
Figure 19:
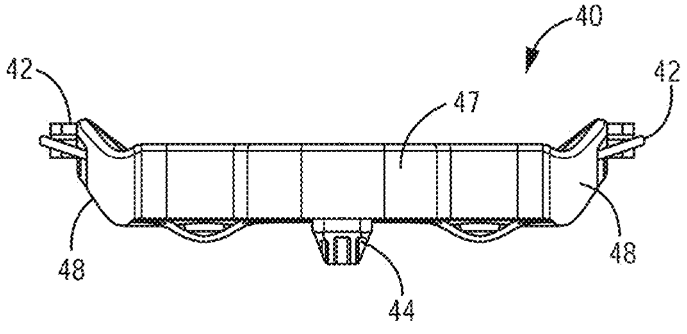
FIG. 19 is a front view of the support structure, according to one implementation.
Figure 20:
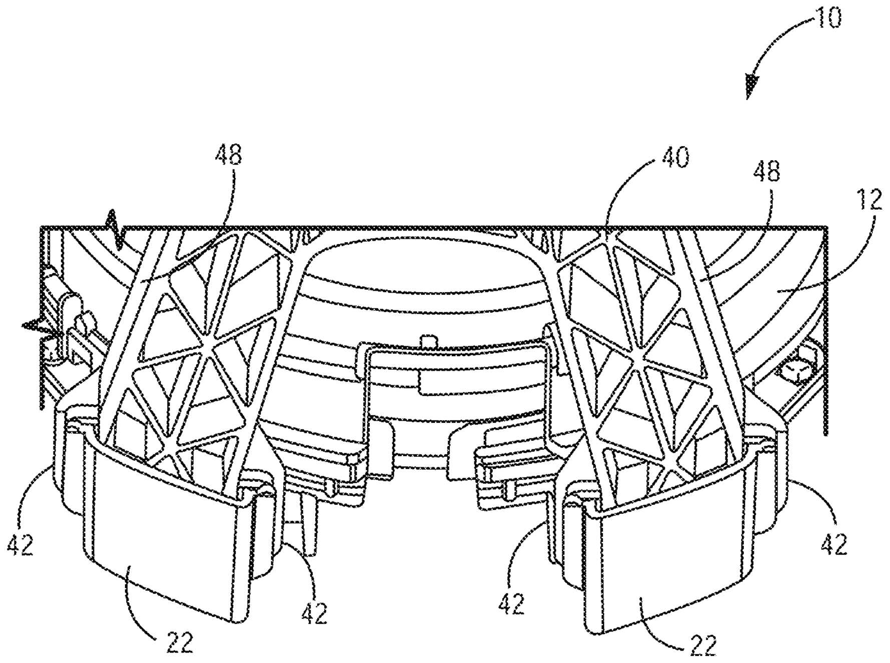
FIG. 20 is a bottom view of the support structure engaged with the meter half shell, according to one implementation.
Figure 21:
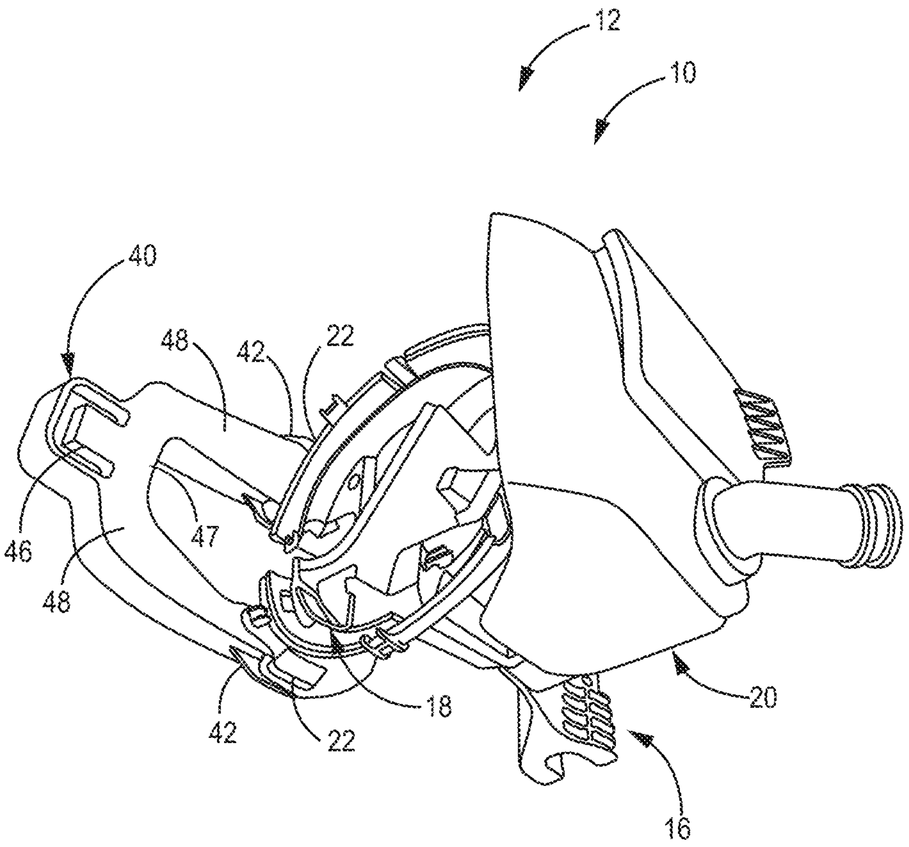
FIG. 21 is a side view of a meter main body assembly connected to a support structure, according to one implementation.
Figure 22:
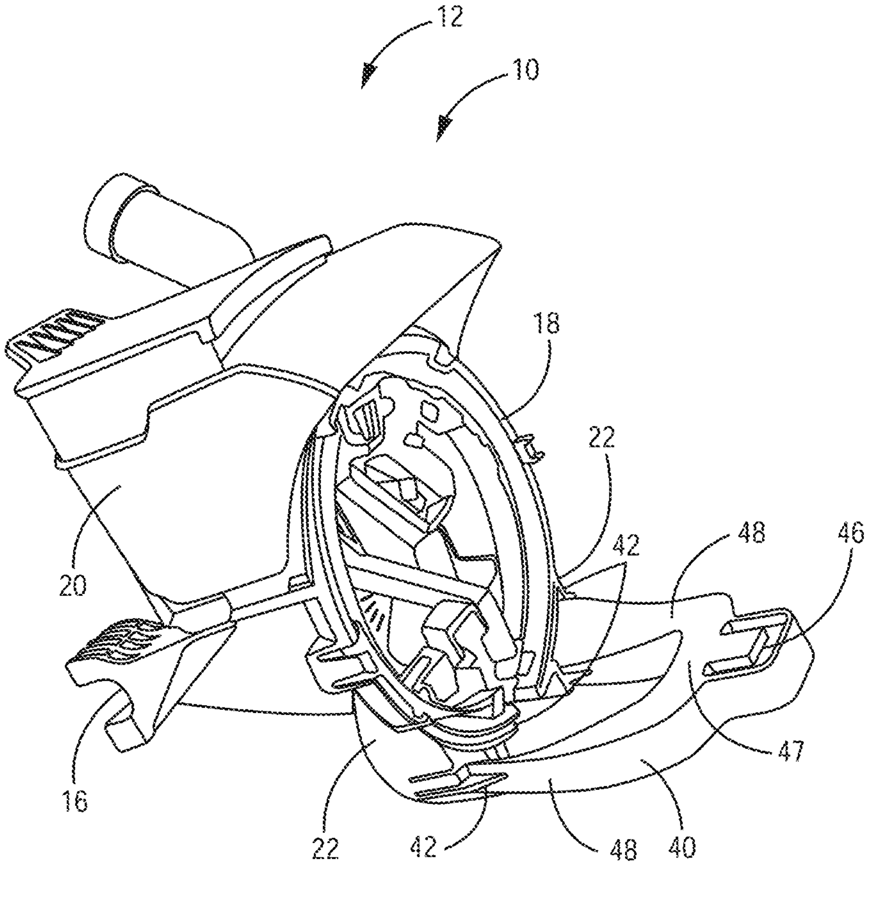
FIG. 22 is a perspective view of a meter main body assembly connected to a support structure, according to one implementation.
Figure 23:
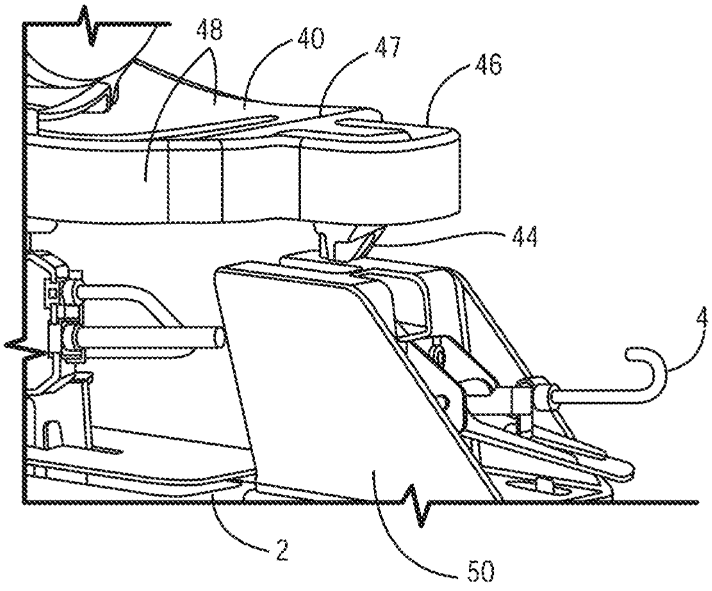
FIG. 23 is a side perspective view of the meter and support structure being installed on a row unit, according to one implementation.
Figure 24:
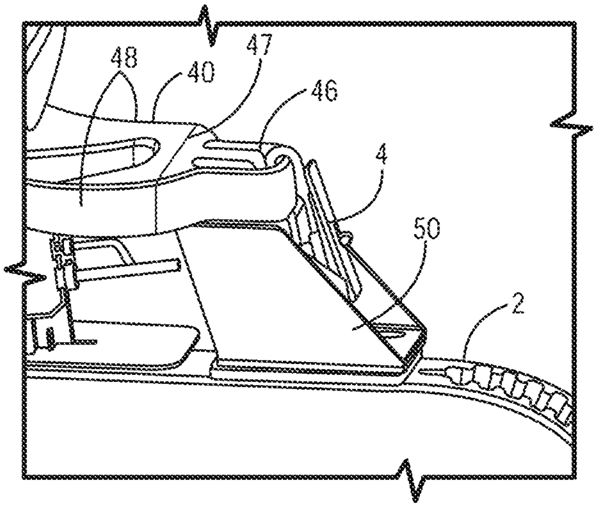
FIG. 24 is a side view of the meter and support structure installed on a row unit, according to one implementation.
Figure 25:
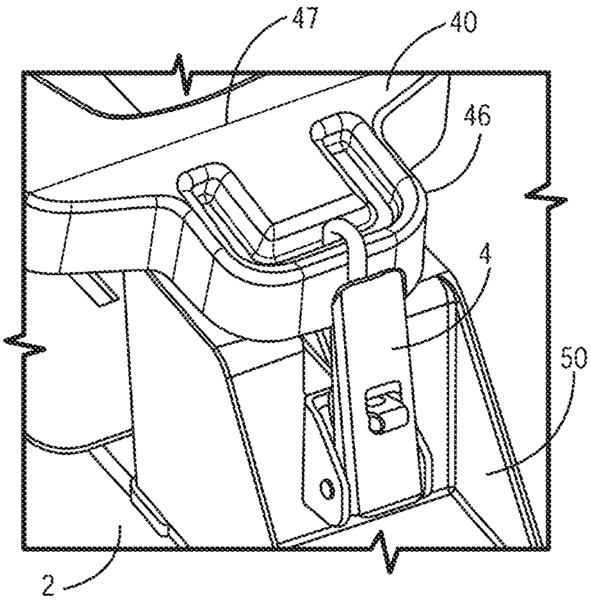
FIG. 25 is a front view of an under-center latch engaging the support structure, according to one implementation.
Figure 26:
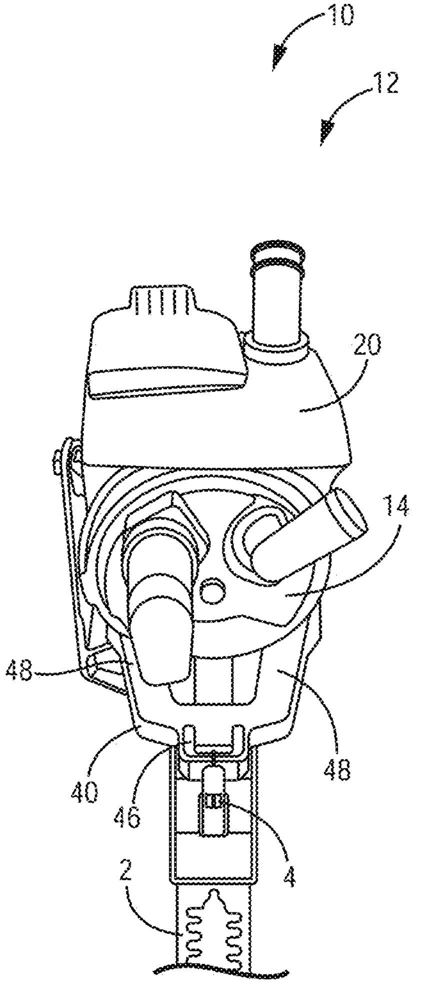
FIG. 26 is a rear view of a meter assembly installed on a row unit via the support structure, according to one implementation.
Figure 27:
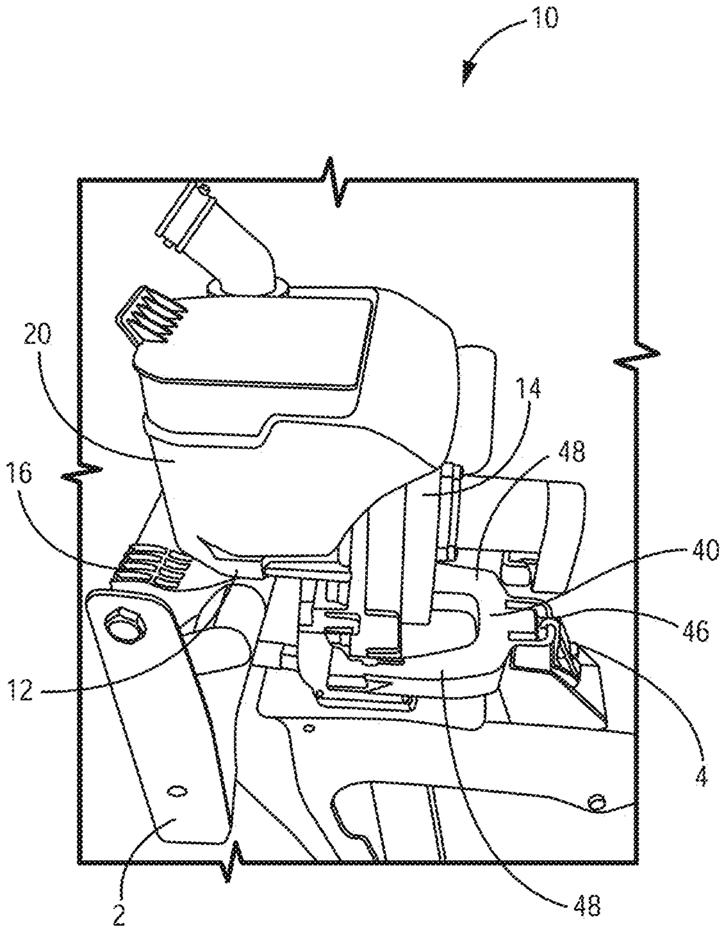
FIG. 27 is a side view of a meter assembly installed on a row unit via the support structure, according to one implementation.
Figure 28:
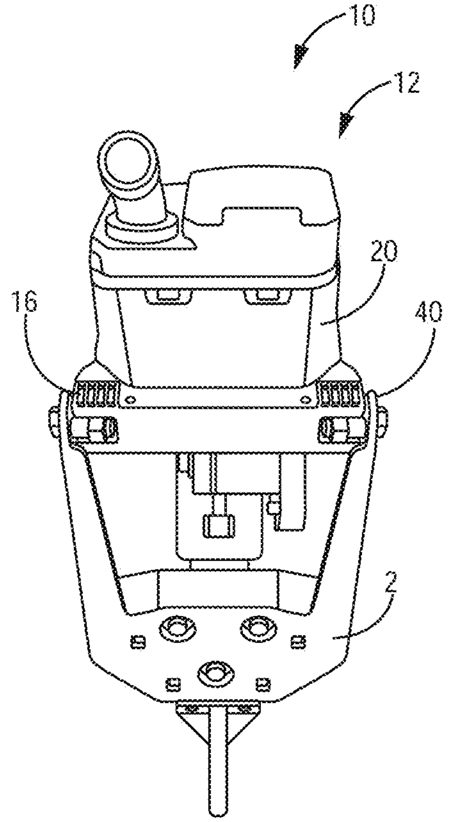
FIG. 28 is a front view of a meter assembly installed on a row unit via the support structure, according to one implementation.

Described herein are various devices, systems, and methods related to agricultural row units. The various implementations relate to supporting and mounting of seed meters and seed hoppers on row units. In various implementations, a support structure is provided for a hopper to allow maximum accessibility and serviceability to a seed meter while also allowing either a fractional or multi-bushel hopper to also be installed. As would be appreciated, the mounting devices, systems and methods described herein are configured to maximize production and minimize downtime as is necessary for modern farming to maximize yields and efficiency.

Turning now to the figures in more detail, as would be appreciated, a seed meter assembly 10 typically consists of two key parts, shown in FIGS. 4-7, a main body assembly 12 and a meter cover assembly 14. In various implementations, the main body assembly 12 consists of a front pivot mounting point 16, a first meter half shell 18, a seed supply hopper 20, and two snap-in attachment locations 22. As would be understood, the seed supply hopper 20 can be multi-bushel or fractional bushel seed hopper 20. In certain implementations, the two snap-in attachment locations 22 are not used when a multi-bushel hopper 20 is installed on the row unit, but are used when a fractional bushel hopper 20 is installed.

As would be appreciated, typically, the seed hoper 20 is attached to and located on a row unit by widely spread pivot points at the front of the hopper 20 and a centrally located tie point at the rear of the hopper 20. When multi-bushel seed hoppers 20 are installed, this configuration of pivot and tie points carries the weight of the seed in the hopper 20 so the weight of the hopper 20 and seed therein is not transferred to the meter structure 10. When smaller (fractional bushel capacity) hoppers 20 are installed, such as for plots or as termination locations for a centralized seed delivery system, the same pivot and tie down points are used for mounting the hopper 20 structure.

As would be understood, the meter cover assembly 14 also includes a second meter half shell 24 optionally including a seed disk 26, the drive motor 28, and drive mechanism 30. As would be appreciated, a vacuum source may also be attached to the meter cover assembly 14 to draw seeds from the seed supply 20 to the seed disk 26 surface.

As would be further understood, the meter cover assembly 14 attaches to the main body assembly 12 using a twist-lock mechanism, or other known mechanism. Various further meter structures 10 and configurations thereof are possible and would be recognized by those of skill in the art. The mounting devices, systems, and methods described herein may be compatible with any number of further seed meter assembly 10 configurations.

In the various implementations disclosed and contemplated herein, a support structure 40 is provided to support the weight of a seed hopper 20, such that the weight of the hopper 20 and any seed therein is supported by the row unit and not a seed meter assembly 10. The support structure 40 is shown variously in FIGS. 8-19. In certain implementations, the seed hopper 20 is a fractional bushel hopper 20.

In various implementations, the support structure 40 is a generally U-shaped article that includes two arm portions 48 connected by a center portion 47. Various alternative configurations and shapes are possible and would be appreciated by those of skill in the art.

In various implementations, the support structure 40 includes one or more snap-in features 42 for engagement with receiving cavities 22 (also referred to herein as "snap-in attachment locations 22") on the meter half shell (shown in engagement in FIGS. 20-23). In certain implementations, the support structure includes at least one snap-in feature on each of the arms 48. In certain further implementations, the support structure includes four snap-in features 42, two on opposing sides of each arm 48.

In various implementations, the support structure 40 also includes a latch groove 46 along the center portion 47. In these and other implementations, the latch groove 46 is located on a projection at the center portion 47 between the two elongate arms 48 and between the snap features 42. The latch groove 46 is shown variously in FIGS. 8-10, 13-15 and 21-27.

In various implementations, the latch groove 46 is configured to capture a J-bolt hook 4 of an under-center latch mechanism, or other similar latching structure as would be appreciated, to secure the meter 10 and support structure 40 to the row unit 2. In various implementations, the under-center latch mechanism and J-bolt hook 4 is attached directly to the row unit 2 or alternatively to an intermediate bracket 50 (shown in FIGS. 23-25 and discussed further below) fastened to the row unit 2. Various alternative latching and attachment mechanisms are possible and would be appreciated by those of skill in the art.

In various additional or alternative implementations, an intermediate bracket 50 is fastened to the row unit 2 for receiving the peg 44 and/or providing a latch, as described elsewhere herein. In various of these implementations the bracket 50 is configured for securing the meter 10 and hopper 10 to the row unit 2.

In certain further implementations, the support structure 40 includes a peg 44 (shown variously in FIGS. 11, 12, 16, and 18). In these implementations, the peg 44 extends below the support structure 40 at or near the latch groove 46 to engage a receiving feature on the row unit 2 or bracket 50, as would be understood. That is, the peg 44 is on the row unit 2 side of the support structure 40 for engaging either the row unit 2 or the bracket 50 on the row unit. In implementations having a peg 44, once engaged, the peg 44 constrains movement of the meter 10 both laterally (side to side) and front to back. In certain implementations, the peg 44 may be tapered such as to self-align with the row unit 2/bracket 50 receiving feature as it is installed.

Continuing with FIGS. 20-32, in various implementations, the support structure 40 is installed on the main body assembly 12 at the snap-in attachment locations 22. In various of these implementations, the distal end of the arms 48 are inserted into the snap-in attachment locations 22 and such that the snap-in features 42 on the arms 48 are disposed around the snap-in attachment locations 22, creating a secure and releasable attachment. That is, in various implementations, the snap-in features 42 clamp/grip the snap-in attachment locations 22 when the arms 48 are inserted into the receiving cavities 22.

In these and other implementations, the support structure 40 provides a structural attachment point on the meter assembly 10 that is positioned below the meter cover assembly 14, such that the support structure does not obstruct the view of the complete assembly 10, as can be seen variously in FIGS. 26-32.

Figure 29:
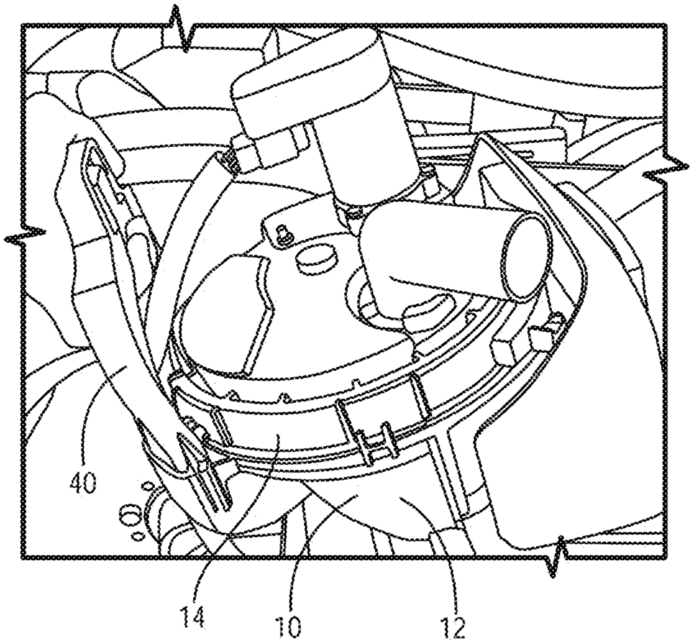
FIG. 29 is a perspective view of a meter assembly in a horizontal position being lifted by the support structure, according to one implementation.
Figure 30:
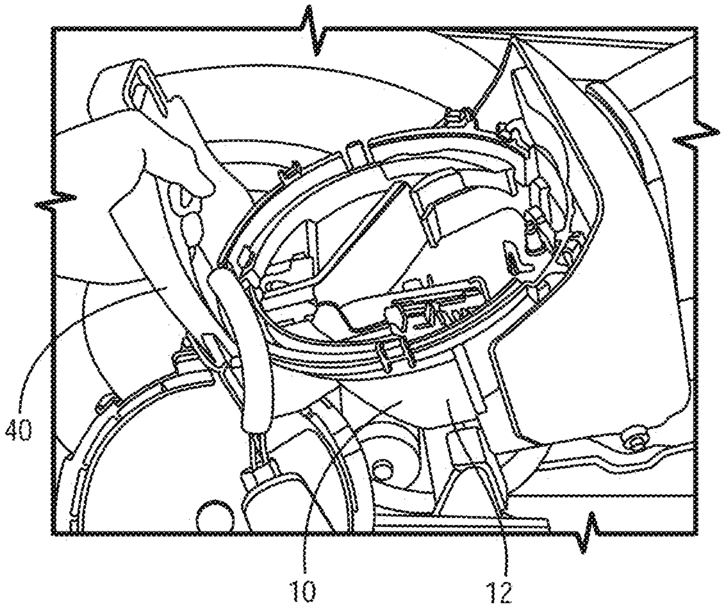
FIG. 30 is a perspective view of a meter assembly with the meter cover removed and being lifted by the support structure into a horizontal position, according to one implementation.
Figure 31:
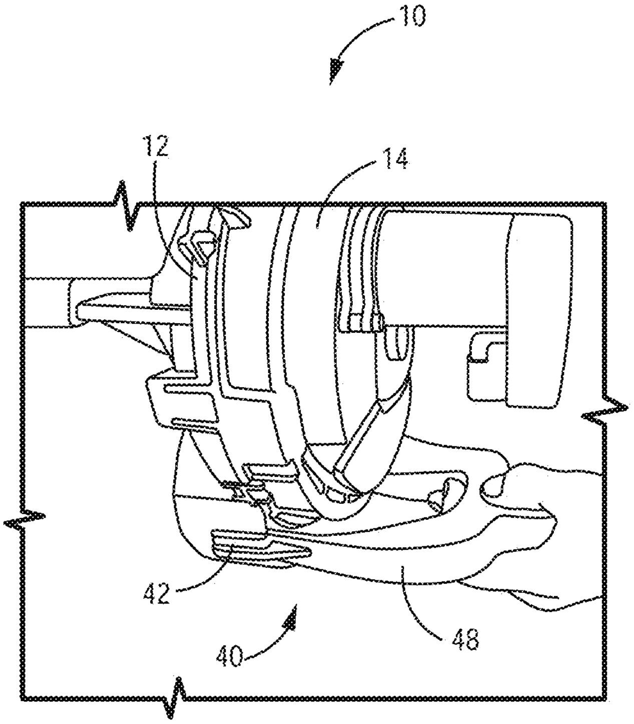
FIG. 31 is a side view showing use of the support structure as a handle when the seed meter is not installed, according to one implementation.
Figure 32:
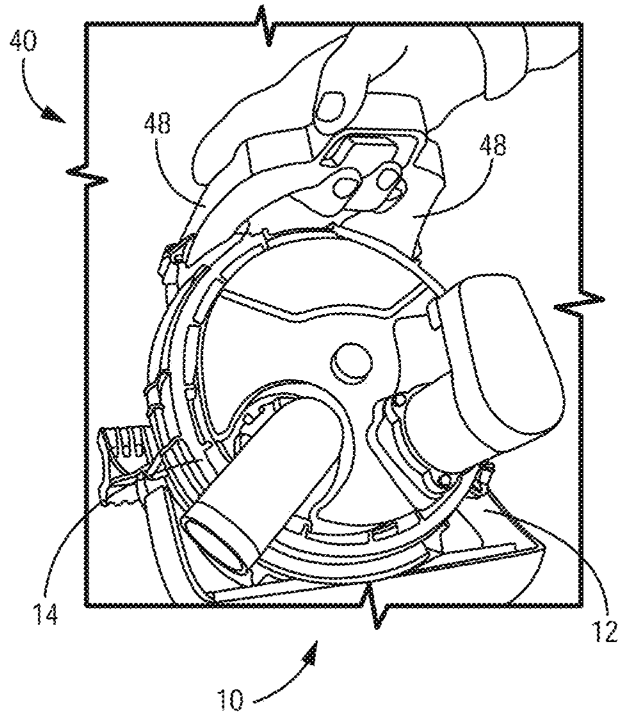
FIG. 32 is a perspective view showing use of the support structure as a handle when the seed meter is not installed, according to one implementation.

In further implementations, the support structure 40 may also act as a handle to lift the seed meter 10 into a horizontal position, as shown in FIGS. 29-30. As would be appreciated, in the horizontal position the meter cover assembly 14 can be removed without allowing seeds in the supply hopper 20 to flow out when the meter cover assembly 14 is removed for inspection and repair. Additionally, the support structure 40 may provide a handle for secure and easy handling and transport of meters 10 when not engaged with a row unit 2.

The support structure 40 may be made of plastic, metal, or any other appropriate material or materials, as would be appreciated.

Certain of the disclosed implementations can be used in conjunction with any of the devices, systems or methods taught or otherwise disclosed in U.S. Pat. No. 10,684,305 issued Jun. 16, 2020, entitled "Apparatus, Systems and Methods for Cross Track Error Calculation From Active Sensors," U.S. patent application Ser. No. 16/121,065, filed Sep. 4, 2018, entitled "Planter Down Pressure and Uplift Devices, Systems, and Associated Methods," U.S. Pat. No. 10,743,460, issued Aug. 18, 2020, entitled "Controlled Air Pulse Metering apparatus for an Agricultural Planter and Related Systems and Methods," U.S. Pat. No. 11,277,961, issued Mar. 22, 2022, entitled "Seed Spacing Device for an Agricultural Planter and Related Systems and Methods," U.S. patent application Ser. No. 16/142,522, filed Sep. 26, 2018, entitled "Planter Downforce and Uplift Monitoring and Control Feedback Devices, Systems and Associated Methods," U.S. Pat. No. 11,064,653, issued Jul. 20, 2021, entitled "Agricultural Systems Having Stalk Sensors and/or Data Visualization Systems and Related Devices and Methods," U.S. Pat. No. 11,297,768, issued Apr. 12, 2022, entitled "Vision Based Stalk Sensors and Associated Systems and Methods," U.S. patent application Ser. No. 17/013,037, filed Sep. 4, 2020, entitled "Apparatus, Systems and Methods for Stalk Sensing," U.S. patent application Ser. No. 17/226,002 filed Apr. 8, 2021, and entitled "Apparatus, Systems and Methods for Stalk Sensing," U.S. Pat. No. 10,813,281, issued Oct. 27, 2020, entitled "Apparatus, Systems, and Methods for Applying Fluid," U.S. patent application Ser. No. 16/371,815, filed Apr. 1, 2019, entitled "Devices, Systems, and Methods for Seed Trench Protection," U.S. patent application Ser. No. 16,523,343, filed Jul. 26, 2019, entitled "Closing Wheel Downforce Adjustment Devices, Systems, and Methods," U.S. patent application Ser. No. 16/670,692, filed Oct. 31, 2019, entitled "Soil Sensing Control Devices, Systems, and Associated Methods," U.S. patent application Ser. No. 16/684,877, filed Nov. 15, 2019, entitled "On-The-Go Organic Matter Sensor and Associated Systems and Methods," U.S. Pat. No. 11,523,554, issued Dec. 13, 2022, entitled "Dual Seed Meter and Related Systems and Methods," U.S. patent application Ser. No. 16/891,812, filed Jun. 3, 2020, entitled "Apparatus, Systems and Methods for Row Cleaner Depth Adjustment On-The-Go," U.S. patent application Ser. No. 16/918,300, filed Jul. 1, 2020, entitled "Apparatus, Systems, and Methods for Eliminating Cross-Track Error," U.S. patent application Ser. No. 16/921,828, filed Jul. 6, 2020, entitled "Apparatus, Systems and Methods for Automatic Steering Guidance and Visualization of Guidance Paths," U.S. patent application Ser. No. 16/939,785, filed Jul. 27, 2020, entitled "Apparatus, Systems and Methods for Automated Navigation of Agricultural Equipment," U.S. patent application Ser. No. 16/997,361, filed Aug. 19, 2020, entitled "Apparatus, Systems and Methods for Steerable Toolbars," U.S. patent application Ser. No. 16/997,040, filed Aug. 19, 2020, entitled "Adjustable Seed Meter and Related Systems and Methods," U.S. patent application Ser. No. 17/011,737, filed Sep. 3, 2020, entitled "Planter Row Unit and Associated Systems and Methods," U.S. patent application Ser. No. 17/060,844, filed Oct. 1, 2020, entitled "Agricultural Vacuum and Electrical Generator Devices, Systems, and Methods," U.S. patent application Ser. No. 17/105,437, filed Nov. 25, 2020, entitled "Devices, Systems and Methods For Seed Trench Monitoring and Closing," U.S. patent application Ser. No. 17/127,812, filed Dec. 18, 2020, entitled "Seed Meter Controller and Associated Devices, Systems and Methods," U.S. patent application Ser. No. 17/132,152, filed Dec. 23, 2020, entitled "Use of Aerial Imagery For Vehicle Path Guidance and Associated Devices, Systems, and Methods," U.S. patent application Ser. No. 17/164,213, filed Feb. 1, 2021, entitled "Row Unit Arm Sensor and Associated Systems and Methods," U.S. patent application Ser. No. 17/170,752, filed Feb. 8, 2021, entitled "Planter Obstruction Monitoring and Associated Devices and Methods," U.S. patent application Ser. No. 17/225,586, filed Apr. 8, 2021, entitled "Devices, Systems, and Methods for Corn Headers," U.S. patent application Ser. No. 17/225,740, filed Apr. 8, 2021, entitled "Devices, Systems, and Methods for Sensing the Cross Sectional Area of Stalks," U.S. patent application Ser. No. 17/323,649, filed May 18, 2021, entitled "Assisted Steering Apparatus and Associated Systems and Methods," U.S. patent application Ser. No. 17/369,876, filed Jul. 7, 2021, entitled "Apparatus, Systems, and Methods for Grain Cart-Grain Truck Alignment and Control Using GNSS and/or Distance Sensors," U.S. patent application Ser. No. 17/381,900, filed Jul. 21, 2021, entitled "Visual Boundary Segmentations and Obstacle Mapping for Agricultural Vehicles," U.S. patent application Ser. No. 17/461,839, filed Aug. 30, 2021, entitled "Automated Agricultural Implement Orientation Adjustment System and Related Devices and Methods," U.S. patent application Ser. No. 17/468,535, filed Sep. 7, 2021, entitled "Apparatus, Systems, and Methods for Row-by-Row Control of a Harvester," U.S. patent application Ser. No. 17/526,947, filed Nov. 15, 2021, entitled "Agricultural High Speed Row Unit," U.S. patent application Ser. No. 17/566,678, filed Dec. 20, 2021, entitled "Devices, Systems, and Method For Seed Delivery Control," U.S. patent application Ser. No. 17/576,463, filed Jan. 14, 2022, entitled "Apparatus, Systems, and Methods for Row Crop Headers," U.S. patent application Ser. No. 17/724,120, filed Apr. 19, 2022, entitled "Automatic Steering Systems and Methods," U.S. patent application Ser. No. 17/742,373, filed May 11, 2022, entitled "Calibration Adjustment for Automatic Steering Systems," U.S. patent application Ser. No. 17/902,366, filed Sep. 2, 2022, entitled "Tile Installation System with Force Sensor and Related Devices and Methods," U.S. patent application Ser. No. 17/939,779, filed Sep. 7, 2022, entitled "Row-by-Row Estimation System and Related Devices and Methods," U.S. patent application Ser. No. 18/081,432, filed Dec. 14, 2022, entitled "Seed Tube Guard and Associated Systems and Methods of Use," U.S. patent application Ser. No. 18/087,413, filed Dec. 22, 2022, entitled "Data Visualization and Analysis for Harvest Stand Counter and Related Systems and Methods," U.S. patent application Ser. No. 18/097,801, filed Jan. 17, 2023, entitled "Agricultural Mapping and Related Systems and Methods," U.S. Patent Application 63/303,144, filed Jan. 26, 2022, entitled "Load Cell Backing Plate," U.S. Patent Application 63/315,850, filed Mar. 2, 2022, entitled "Cross Track Error Stalk Sensor," U.S. Patent Application 63/346,665, filed May 27, 2022, entitled "Seed Delivery Tube Camera for Furrow Monitoring," U.S. Patent Application 63/351,602, filed Jun. 13, 2022, entitled "Apparatus, Systems and Methods for Image Plant Counting," U.S. Patent Application 63/357,082, filed Jun. 30, 2022, entitled "Seed Tube Guard," U.S. Patent Application 63/357,284, filed Jun. 30, 2022, entitled "Grain Cart Bin Level Sharing," U.S. Patent Application 63/394,843, filed Aug. 3, 2022, entitled "Hydraulic Cylinder Position Control for Lifting and Lowering Towed Implements," U.S. Patent Application 63/395,061, filed Aug. 4, 2022, entitled "Seed Placement in Furrow," U.S. Patent Application 63/400,943, filed Aug. 25, 2022, entitled "Combine Yield Monitor," U.S. Patent Application 63/406,151, filed Sep. 13, 2022, entitled "Hopper Lid with Magnet Retention and Related Systems and Methods," U.S. Patent Application 63/427,028, filed Nov. 21, 2022, entitled "Stalk Sensors and Associated Devices, Systems and Methods."

Although the disclosure has been described with references to various embodiments, persons skilled in the art will recognized that changes may be made in form and detail without departing from the spirit and scope of this disclosure.

What is claimed is:

1. A seed meter assembly comprising:

(a) a main body assembly comprising:

(i) a pivot mounting point and (ii) two snap-in attachments, (b) a meter cover assembly, wherein the meter cover assembly and the main body assembly are configured to be releasably engaged; and (c) a support structure configured to be attached to the two snap-in attachments to support the weight of the seed meter assembly and maintain access to the seed meter assembly, wherein the support structure comprises:

(i) a first arm;

(ii) a second arm;

(iii) a first snap-in feature at the distal end of the first arm; and (iv) a second snap-in feature at the distal end of the second arm, wherein the first snap-in feature is configured to engage a first of the two snap-in attachments and wherein the second snap-in feature is configured to engage a second of the two snap-in attachments.

2. The seed meter assembly of claim 1, wherein the support structure further comprises a center portion connecting the first arm and the second arm, the center portion comprising a latch groove.

3. The seed meter assembly of claim 2, further comprising a latch disposed on a row unit, wherein a hook of the latch engages the latch groove.

4. The seed meter assembly of claim 3, wherein the latch is an under-center latch.

5. The seed meter assembly of claim 3, further comprising a peg disposed on a row unit side of the center portion of the support structure, wherein the peg is configured to prevent lateral movement of the support structure when installed.

6. The seed meter assembly of claim 5, wherein the peg is tapered.

7. The seed meter assembly of claim 5, wherein the peg is configured to fit within a receiving feature on the row unit.

8. The seed meter assembly of claim 7, further comprising a bracket comprising the receiving feature and the under-center latch.

9. The seed meter assembly of claim 1, further comprising a third snap-in feature at the distal end of the first arm and a fourth snap-in feature at the distal end of the second arm, wherein the third snap-in feature is configured to engage the first of the two snap-in attachments and wherein the fourth snap-in feature is configured to engage the second of the two snap-in attachments.

10. The seed meter assembly of claim 2, wherein at least of portion of the first arm is received within the first of the two snap-in attachments and at least of portion of the second arm is received within the second of the two snap-in attachments.

11. The seed meter assembly of claim 1, wherein the support structure is substantially U-shaped.

* * * * *